(12) United States Patent
Martin

(10) Patent No.: US 7,093,774 B2
(45) Date of Patent: Aug. 22, 2006

(54) DEVICE FOR INJECTING A PULSED SUPERSONIC GAS STREAM

(75) Inventor: Gilles Martin, Dauphin (FR)

(73) Assignee: Commissariat a l'Energie Atomique, (FR)

( * ) Notice: Subject to any disclaimer, the term of this patent is extended or adjusted under 35 U.S.C. 154(b) by 0 days.

(21) Appl. No.: 10/542,918

(22) PCT Filed: Jan. 26, 2004

(86) PCT No.: PCT/FR2004/050030

§ 371 (c)(1),
(2), (4) Date: Jul. 20, 2005

(87) PCT Pub. No.: WO2004/071138

PCT Pub. Date: Aug. 19, 2004

(65) Prior Publication Data

US 2006/0086822 A1    Apr. 27, 2006

(30) Foreign Application Priority Data

Jan. 28, 2003    (FR) .................................. 03 00910

(51) Int. Cl.
*B05B 1/08*    (2006.01)

(52) U.S. Cl. ...................... 239/101; 239/321; 239/322; 239/569; 239/533.15; 222/255; 222/263; 222/333

(58) Field of Classification Search ................ 239/101, 239/321, 322, 533.1, 533.15, 569, 570; 222/255, 222/263, 333, 380, 389
See application file for complete search history.

(56) References Cited

U.S. PATENT DOCUMENTS

| 3,343,794 | A | * | 9/1967 | Vyacheslavovich | ......... 239/101 |
| 4,632,214 | A |   | 12/1986 | Bouyoucos | |
| 5,927,329 | A | * | 7/1999 | Yie | ............................ 239/570 |
| 6,431,465 | B1 | * | 8/2002 | Yie | ........................ 239/533.15 |
| 6,471,143 | B1 | * | 10/2002 | Matsuzawa et al. | ......... 239/101 |

FOREIGN PATENT DOCUMENTS

JP    2001-115657    4/2001

OTHER PUBLICATIONS

Wu, Yingxiang, et al "Plasma Density Control By Molecular Beam Injection In HT-7 Tokamak" pp. 393-397, Nagoya, JP, XP008026780.
Lianghua Yao, et al "Hydrogen Cluster-like Behaviour During Supersonic Molecular Beam Injection On The HL-1M Tokamak" pp. 817-826, Austria, XP008026789.
Horioka, K. et al "Supersonic Gas Injection Valve For Beam Neutralization From Applied-B Pulsed Ion Diodes" pp. 792-793, USA, XP002267989.

(Continued)

*Primary Examiner*—Steven J. Ganey
(74) *Attorney, Agent, or Firm*—Anderson Kill & Olick, PC

(57) ABSTRACT

The invention relates to a device (100) for injecting a pulsed supersonic gas flux, including a first chamber (2) inside which the gas to be injected is found under pressure on either side of a free piston (4), the device comprising means (12) for setting this free piston into motion, connected to the first chamber and able to cause propulsion of the free piston (4), the device further including a supersonic nozzle (6) able to communicate with the first chamber via an aperture (8), and also including a valve (10) closing up the aperture (8) and able to be actuated by percussion of the free piston (4).

17 Claims, 6 Drawing Sheets

OTHER PUBLICATIONS

Novak, B. et al "A Fast Acting All-Metal Gas Valve For Plasma Research" pp. 369-373, USA, XP002267990.

Pegourie, B. et al "Supersonic Gas Injection On Tore Supra" pp. 539-542, Stevenage, GB, XP0004415049 Copy of the French Preliminary Search Report as issued by the French Patent Office citing the above references.

Patent Cooperation Treat International Application No. PCT/FR2004/050030—Filing Date Jan. 24, 2004 (in French and English translation).

J.Plasma Fusion Res. SERIES, vol. 2(1999)393-397 Plasma Density Control By Molecular Beam Injection in HT-7 Tokamak (pp. 393-397).

* cited by examiner

DEVICE FOR INJECTING A PULSED SUPERSONIC GAS STREAM

DESCRIPTION

1. Technical Field

The present invention generally relates to devices for injecting a pulsed gas flux.

More specifically, the invention relates to a device allowing matter to be injected into an installation for studying thermonuclear fusion plasmas.

2. State of the Prior Art

In a thermonuclear fusion installation, the fuel which may be used, is for example deuterium and/or tritium. It needs to be heated up to several hundred of millions of degrees, while remaining confined at that temperature for the longest possible period. To do this, the most performing solutions which have been contemplated up to now relate to the use of intense magnetic fields allowing the fusion plasma to be isolated, including the ionized gas at about 300 millions of degrees Kelvin, from the walls of the containment enclosure.

As such, it is noted that good quality of containment is transformed into a major defect for operating the installation. Indeed, if the magnetic field prevents the hot particles from living the plasma, it also prevents replacement of the fuel. However, these risks remain relatively minimal to the extent that exchanges between the outside and the core of the plasma effectively occur, because of the existence of a certain diffusion level created by various factors such as the absence of perfect containment, turbulences, or even continual collisions between the particles of the plasma.

Thus, control of the amount of matter contained in the plasma is therefore achieved by a balancing between the pumping of the particles exiting the plasma towards the wall, and the injection of fresh fuel. In this respect, it is specified that the specific problem of supplying an ultravacuum chamber with a light gas such as hydrogen or helium, requires a very good seal and very good control.

From the prior art, two distinct solutions are known today for achieving injection of matter into the plasma of a thermonuclear fusion installation.

A first solution consists of injecting the fuel as a gas, at room temperature.

This gas injection is generally carried out by means of one or more piezoelectric valves, at a flow rate of the order of 0.1 to 3 $Pa \cdot m^3/s$. As an indication, let us note that the unit used for the amount of matter and commonly used for fusion plasmas, corresponds to the amount of matter contained in a cubic meter at a pressure of one Pascal, measured at a room temperature of 20° C. Still, as an indication, this amount corresponds to $2.7.10^{20}$ molecules and the amount of particles contained in a standard plasma of the "Tore Supra" installation is from about 1 to 2 $Pa \cdot m^3$, renewed every second by means of one to three piezoelectric valves.

On the other hand, the valves used have a response time between 5 and 10 ms, quite suitable for providing controlled feeding of the plasma.

However, in such a case, the gas injected through these valves between the wall of the chamber and the surface of the plasma is ionized as soon as it penetrates by a few centimeters into the latter, so as to be subsequently transferred towards the core of the plasma by diffusion. Now, during the application of this solution, it was seen that the injected matter relatively rapidly exited the core of the plasma, thereby making the phenomenon too little effective.

As such, it was also observed that the effectiveness of this solution, as defined by the ratio between the number of particles reaching the central areas of the plasma and the number of particles injected into the chamber, did not exceed 10–20%. Thus, although the piezoelectric valves used proved to be compatible with the requirement for controlled feeding of the plasma, the effectiveness of this first solution remains too low for optimizing the handling of the gas amounts used on the installation.

A second solution was then suggested in the prior art. It lies in injecting the fuel as a solid, via cryogenic techniques. Deuterium and/or tritium are now solidified at 4° K., in order to form <<ice cubes>> subsequently injected into the installation at a velocity of the order or several hundreds of meters per second, by means of a pneumatic injector of the <<blowpipe>> type, or even by means of a centrifugal injector of the <<sling>> type.

These injectors may operate up to about 10 Hertz, and the formed ice cubes each have an amount of matter from the order of 0.2 to 0.5 $Pa \cdot m^3$, corresponding to a value between 2 and 5 $mm^3$.

In this type of injection, the matter deeply penetrates into the plasma, as the ice cubes are protected from the high temperature prevailing in the core of this plasma by the formation of a very dense gas cloud around every one of them, according to an overheating phenomenon. Indeed, when an ice cube penetrates into the plasma, the matter is partially evaporated and forms a protective cloud, the temperature of which increases as the latter approaches the core of the plasma. A <<globule>> is then generated drifting in the gradient of the magnetic field, until the injected matter is homogeneized with that of the main plasma.

Upon applying such a solution, the effectiveness was proven to be close to 100%. Further, as mentioned above, it was observed that the formed plasma globule, drifting in the magnetic field gradient, still further increased penetration of this matter towards the core of the plasma.

However, in spite of the good effectiveness of the feeding provided by this second injection solution, the complexicity of its application is directly expressed by costs 10 to 100 times larger than those for the first solution Moreover, it is further specified that in the present thermonuclear fusion installations, the fuels used in majority are hydrogen and/or deuterium. Now, if the less costly application of the gases remains conceivable in solutions with relatively low effectiveness, this is not the case when the fuel used is considerably more expensive, such as tritium, which is considered as the main fuel for future installations. Further, as tritium is difficult to solidify because of its radioactivity and of the presence of $He^3$ elements, the second injection solution shown earlier is not for that matter totally satisfactory in the perspective of using such a fuel in thermonuclear fusion installations.

OBJECT OF THE INVENTION

The object of the invention is therefore to propose a simple, therefore not very costly application device, allowing rapid injection of gas at a very high pressure, with an intense instantaneous flux, while guaranteeing a good seal between the gas pulses.

This device notably finds application for an installation intended for the study of thermonuclear fusion plasmas. Moreover, it is specified that this device may generally be applied to any injection of gas into a closed chamber such as a combustion chamber of engines, or physico-chemical reactors.

To do this, the object of the invention is a device for injecting a pulsed supersonic gas flux, notably but not exclusively, intended for feeding fuel into an installation for studying thermonuclear fusion plasmas. According to the invention, the injection device includes a first chamber inside which the gas to be injected is found under pressure on either side of a free piston, the device comprising means for setting this free piston into motion, connected to the first chamber and able to cause propulsion of the free piston. Further, the device includes a supersonic nozzle for ejecting gas, capable of communicating with the first chamber via an aperture provided in this first chamber, as well as a valve closing up the aperture, and capable of being actuated by percussion of the free piston.

Advantageously, the injection device according to the invention is of a simple design, quite suitable for an installation for studying thermonuclear fusion plasmas.

Thus, as the principle of the invention lies on injecting rapid and concentrated gas puffs, with this specific feature, it is possible to retain a simplicity of application, similar to the one encountered in the first solution from the prior art, when the gas injection was achieved by piezoelectric valves. Moreover, the proposed particular configuration also allows injection of gases, the characteristics of which strongly approach the ones relative to the second solution described in the prior art, when injection of the fuel is achieved in the form of ice cubes.

The device according to the invention may then advantageously achieve an efficiency of the order of 50–60%, therefore much higher than the one obtained with the first solution of the prior art, while being designed so that its cost is at least ten times less than that of the second solution of the prior art.

Tests carried out on the <<Tore Supra>> installation have demonstrated on the other hand that the shown injection device allowed injection of a gas pulse in an amount of the order of 0.5 Pa·m$^3$ for about 0.5 ms at an operating frequency at least equal to 10 Hertz, with these values, very satisfactory feeding of fuel to the installation may be provided.

Preferentially, the means for setting the free piston into motion are capable of generating a pressure difference in the gas to be injected, on either side of the free piston. To do this, provision may be made so that these means for setting into motion comprise a second chamber inside which the gas to be injected is found under pressure on either side of a controlled piston.

In such a case, the second chamber may then be connected to the first chamber via a first connection conduit having a first end portion of the first chamber communicating with a second end portion of the second chamber and via a second connection conduit, having a first end portion of the second chamber communicate with a second end portion of the first chamber. Thus, a controlled movement of the piston in the direction from the second to the first end portion of the second chamber causes the free piston to be propelled in the direction from the second to the first end portion of the first chamber, and vice versa.

With such an arrangement, provision may then be made for the controlled piston to be actuated by a magnetic assembly, including two spaced out coils and mounted so as to encircle the second chamber of the device.

Further, the first end portion of the second chamber preferentially includes a gas inlet, intended to be connected to a supply of gas to be injected. In this respect, in order to provide filling of the whole of the device with the gas to be injected, the second chamber may be provided with an adjustable by-pass allowing the gas to be injected to flow between the first and second end portions of this second chamber. It is further possible to provide this function by providing that at least one of the components taken from the free piston and the controlled piston is housed in its respective chamber so as to form a narrow passage for the gas, between the two compartments of the chamber which it defines.

In a preferred embodiment of the device according to the invention, the first chamber is closed up at its second end portion by means of a closing block comprising a first and second port, the first port cooperating with the first connection conduit and opening up into a channel adjacent to the first chamber communicating with the first end portion of this first chamber, the second port cooperating with the second connection conduit and directly opening up into the first chamber of the device.

Moreover, the valve closing up the aperture provided in the first chamber of the device may have a head passing through this aperture and protruding in an injection enclosure provided in the first end portion, the injection enclosure capable of being closed by the free piston. To do this, the free piston is advantageously designed so as to include an external component as well as an internal component sliding within the external component, the internal component being intended for striking the head of the valve to actuate it, and the external component being intended for closing the injection enclosure.

In this preferred embodiment, the valve is tensioned via a spring, so as to crush a gasket seal located around the aperture provided in the first chamber of the device. The spring is then located in a housing made as a single part with the first chamber, this same housing as well as the chamber being substantially cylindrical and coaxial, and separated by the aperture provided in the first chamber of the device. On the other hand, the housing of the spring has a port, having an interior space of this housing communicate with the supersonic nozzle of the device.

Finally, let us note that the means for setting the free piston into motion are capable of causing the opening of the valve during a period of about 2 ms, and the ejection of gas from the supersonic nozzle in an amount of the order of 0.5 Pa·m$^3$ during a period of about 0.5 ms, at an operating frequency of at least 10 Hz.

Other advantages and features of the invention will become apparent in the detailed non-limiting description below.

BRIEF DESCRIPTION OF THE DRAWINGS

This description will be made with reference to the appended drawings wherein.

DETAILED DESCRIPTION OF THE PREFERRED EMBODIMENTS

Figure 1:
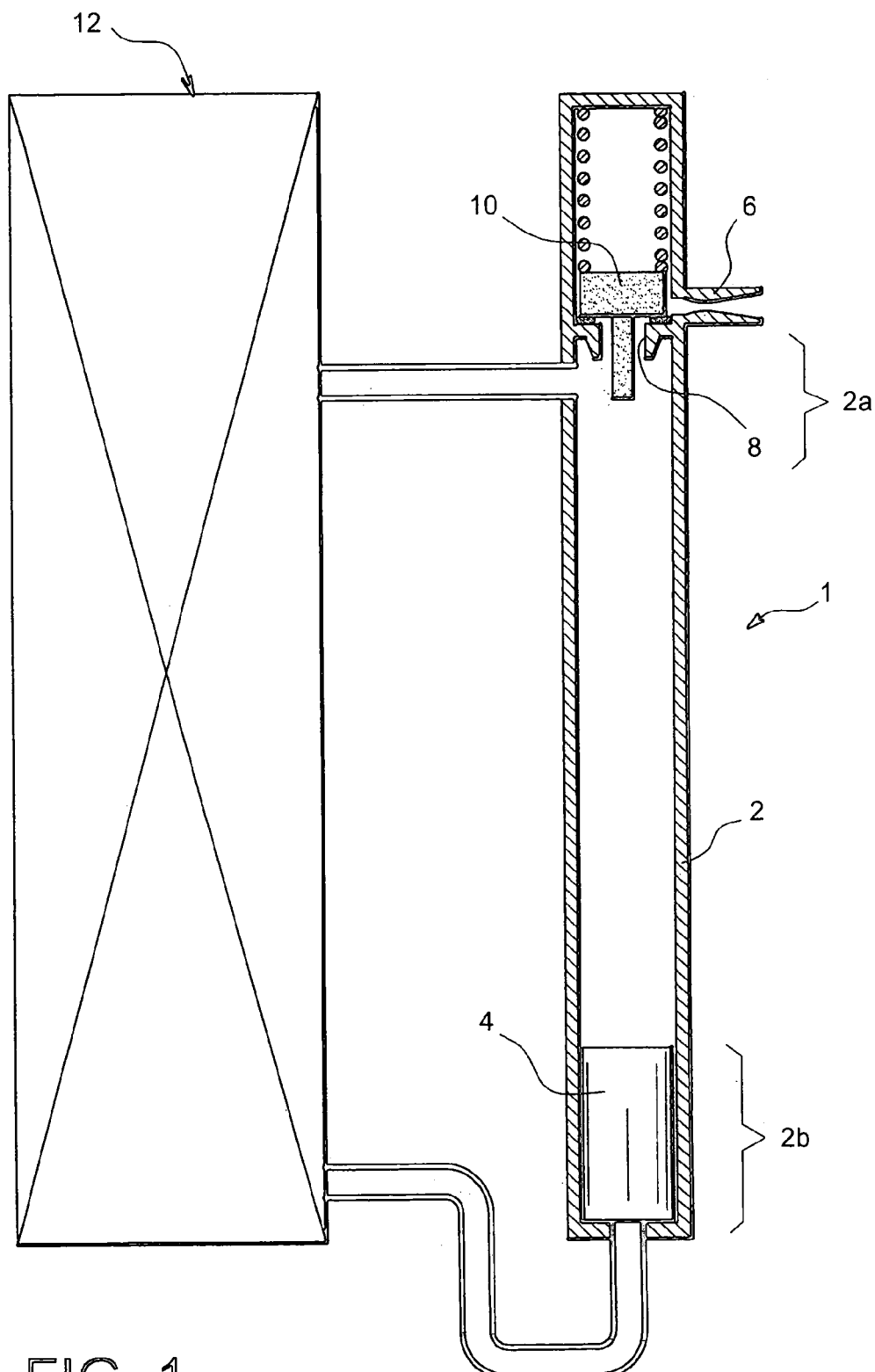
FIG. 1 illustrates a schematic view of a device for injecting a pulsed supersonic gas flux, schematizing the principle of the invention

With reference to FIG. 1, a device for injecting 1 a pulsed supersonic gas flux, is illustrated, schematizing the principle of the invention.

The injection device 1 includes a first chamber 2, inside which a free piston 4 is found, the gas to be injected being under pressure on either side of this free piston 4.

The device 1 further includes a supersonic nozzle 6, through which the gas is able to be ejected, to generate a pulsed supersonic flux.

As it may be seen in FIG. 1, the first chamber 2 is able to communicate with the supersonic nozzle 6, notably by means of an aperture 8 provided in this first chamber 2 of the device 1 and closed up by a valve 10.

In order to generate the pulsed supersonic gas flux, the device 1 is provided with means 12 for setting the free piston 4 into motion, connected to the first chamber and able to cause the free piston 4 to be propelled into this first chamber 2 of the injection device 1.

Thus, with such a configuration, the free piston 4 moving in the first chamber 2 is able to strike the valve 10 in order to clear the aperture 8 during a determined period, and to allow the gas to be injected to pass between the first chamber 2 and the supersonic nozzle 6.

Figure 2:
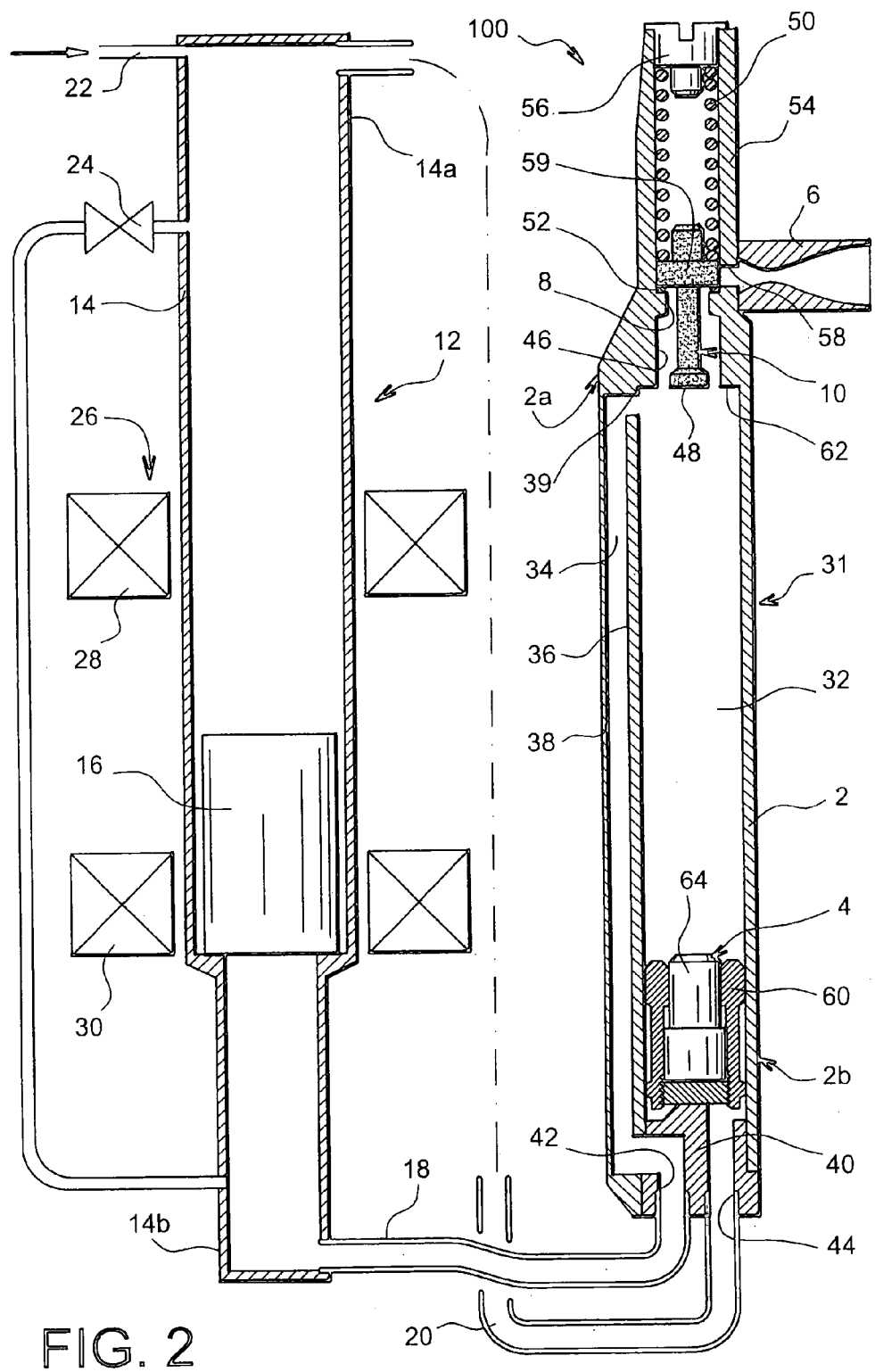
FIG. 2 illustrates a sectional view of a device for injecting a pulsed supersonic gas flux, according to a preferred embodiment of the present invention.

FIG. 2 illustrates a device 100 for injecting a pulsed supersonic gas flux according to a preferred embodiment of the present invention.

As mentioned earlier in the principle of the invention, the injection device 100 includes a first chamber 2, a free piston 4 able to be set into motion inside the first chamber 2, a supersonic nozzle 6, and aperture 8 in the first chamber 2, as well as a valve 10 closing up this aperture.

In this preferred embodiment of the present invention, the means 12 for setting the free piston 4 into motion include a second chamber 14 inside which a controlled piston 16 is found, the gas to be injected being under pressure on either side of this free piston 16.

In order to provide the connection between the first chamber 2 and the second chamber 14 of the injection device 100, the latter comprises a first connection conduit 18, having a first end portion 2a of the first chamber 2 communicate with a second end portion 14b of the second chamber 14. Further, the device 100 is also provided with a second connection conduit 20, having a first end portion 14a of the second chamber 14 communicate with a second end portion 2b of the first chamber 2.

The connection conduits 18 and 20 are therefore also filled with gas to be injected, and configured so that a movement of the controlled piston 16 in the direction from the second end portion 14b towards the first end portion 14a of the second chamber 2 generates pressure/negative pressure on either side of the free piston 4, thereby causing this free piston 4 to be propelled in the direction from the second end portion 2b towards the first end portion 2a of the first chamber 2.

Likewise, it may be noted that a movement of the controlled piston 16 in the direction from the first end portion 14a towards the second end portion 14b of the second chamber 2 generates propulsion of the free piston 4 in the direction from the first end portion 2a towards the second end portion 2b of the first chamber 2.

Moreover, it is specified that the first end portions 2a and 14a of the first and second chambers 2 and 4 preferentially correspond to high end portions, whereas the second end portions 2b and 14b of the first and second chambers 2 and 4 correspond to low end portions. Thus, because of the substantially vertical position of the first and second chambers 2 and 14, when the injection device 100 is in a rest position, such as the one illustrated in FIG. 2, the pressure of the gas to be injected is substantially identical in all the constitutive components of the device 100, then allowing the free and controlled pistons 4 and 16 to be located by gravity at the second low end portions 2b and 14b of chambers 2 and 14, respectively.

The injection device 100 is connected to a gas supply (not shown), this supply being able to introduce the gas to be injected into the device 100, under a pressure for example between 3 and 10 bars, and preferably under a pressure of about 5 bars. To do this, provision may be made for the supply to be connected to a gas inlet 22, communicating with the first end portion 14a of the second chamber 14.

On the other hand, in order to ensure the presence and a substantially identical pressure of the gas in all the constitutive components of the device 100, the second chamber 14 is connected to an adjustable by-pass 22, allowing the gas to flow between the first end portion 14a and the second end portion 14b therefore on either side of the controlled piston. In this way, after each actuation of the valve 10, causing the clearing of the aperture 8 provided in the first chamber 2, the amount of gas which has escaped through the supersonic nozzle 6 may be re-introduced into the device 100 from the gas inlet 22 and be uniformly distributed in this device by means of the adjustable by-pass 24, allowing balancing of the pressures at a time scale close to one second.

An additional or alternative solution to the one of the by-pass 22 may consist in providing the presence of a leak at the free and controlled pistons 4 and 16, by providing a passage between these pistons and their associated chambers 2 and 14. Let us note that this passage may quite simply assume the form of play between these different components.

Several techniques for controlling the controlled piston 16 may be contemplated in order to cause displacement of the gas to be injected into the constitutive components of the injection device 100, as well as the pressure/negative pressure at the free piston 4.

In this respect, the bellow compression technique with a hydraulic cylinder may be mentioned. However, in the preferred described embodiment of the present invention, it is a magnetic assembly 26 which allows the controlled piston 16 to be displaced inside the second chamber 14. Let us note that this solution is particularly advantageous to the extent that it allows the inventory of gases to be injected to be strongly limited relatively to the other proposed solutions.

Always in reference to FIG. 2, it is seen that the magnetic assembly 26 includes two vertically spaced out coils 28 and 30 encircling the second chamber 14 of the device 100. This specific configuration of the magnetic lense type allows rapid movement of the controlled piston 16 in its associated chamber 14, as well as the possibility of obtaining a large percussive force of the free piston 4 on the valve 10 of the device 100.

Typically, the coils 28 and 30 are composed with 800 turns of 2.5 mm diameter wire, and powered by a current of the order of 30 to 40 A. The resistance is about 1Ω and the self-inductance of the order of 0.1 H. By achieving measurements, it was then possible to see that the field produced at the controlled piston 16 was 25 mT/A.

As an indication, it should be noted that creating a current in the coils 28 and 30 requires a large amount of power, in particular with a high initial voltage in order to be able to overcome the self-inductance of these coils. A voltage 500 V and an intensity of 40 A may then be values providing an adequate initial electric powering of the coils 28 and 30. Further, for controlling these coils, it is possible to use a simple cheap method aimed at making a resonant RLC circuit between the inductance of the coils 28 and 30 and a bank of capacities (not shown), for example of 530 µF. The latter is charged beforehand before being connected to one of the coils 28, 30, by a fast thyristor, and then connected to the other coil at the moment of the current inversion. In this way, it therefore becomes relatively easy to create a reciprocal motion of the controlled piston 16 in its second associated chamber 14, by means of an electric power supply operating during periods of about 100 ms, at a voltage between 100 and 150 V and at an intensity between 30 and 40 A.

In this preferred embodiment of the present invention, the first chamber 2 is made in a block of material 31, preferably in stainless steel in order to define a substantially cylindrical space 32 with a circular section, into which the free piston 4 is able to be propelled. A channel 34 adjacent to the first chamber 2 is achieved by providing a groove 36 at a sidewall of the material block 31, this groove 36 being closed by a plate 38. As it may be seen in FIG. 2, the adjacent channel 34 communicates with the first end portion 2a corresponding to the upper end portion of the first chamber 2, via a side aperture 39. Further, the adjacent channel 34 runs along this first chamber 2, vertically, so as to extend up to the second end portion 2b, corresponding to the low end portion of this same chamber 2.

The first chamber 2 and the adjacent channel 34 are closed up at their low portions by a closing block 40.

When the closing block 40 is assembled on the material block 31, a first port 42 opens up into the adjacent channel 34 and cooperates with the first connection conduit 18, so as to allow the gas to be injected to flow between the first end portion 2a of the first chamber 2 and the second end portion 14b of the second chamber 14. Moreover, the closing block 40 is also provided with a second port 44, cooperating with the second connection conduit 20 and opening up directly into the second end portion 2b of the first chamber 2, so as to allow the gas to be injected, to flow between the latter and the first end portion 14a of the second chamber 14.

Let us note that the closing block 40 may be assembled by screwing onto the material block 31, and then may be welded to the latter in order to provide a perfect seal.

In the first end portion 2a of the first chamber 2, an injection enclosure 46 is provided, notably delimited in the upper portion by the aperture 8 closed up by the valve 10 of the device 100. As this will be described more specifically below, the injection enclosure 46 may also be delimited in the lower portion by the free piston 4, when the latter comes and strikes the valve 10. The volume of this injection enclosure 46 is of course determined according to the amount of gas which one wants to eject from the supersonic nozzle 6 at each pulse. For example it may be of the order of 0.65 cm³.

The valve 10, closing up the aperture 8 provided in the first chamber 2 of the device 100, has a head 48 passing through this aperture 8 and protruding inside the injection enclosure 46. Further, this valve 10 is tensioned by means of a spring 50 which allows it to crush a gasket seal 52 provided around the aperture 8 provided in the first chamber 2. The gasket seal 52 is preferentially of the fluorinated plastic gasket type, capable of maintaining the seal of the first chamber 2 up to a temperature around 250° C. As for it, the spring 50 is for example adapted so that the maximum opening of the valve 10 requires compression of the spring of the order of 25 daN.

In this preferred embodiment of the present invention, the spring 50 is placed in a housing 54 where it is pre-stressed by a few millimiters, for example 5 mm, by means of a screw 56 located at an upper end of the housing 54. This housing 54 is made in the same material block 31 as the one in which were made the first chamber 2 and the adjacent channel 34 of the device 100. Thus, the housing 54 is substantially cylindrical with a circular section, coaxial to the first chamber 2 and separated from the latter via the aperture 8 which is also coaxial with these two components 2 and 54.

Near the aperture 8 of the first chamber 2, the housing 54 of the spring 50 is provided with a side port 58, having an interior space of the housing 54 communicate with the supersonic nozzle 6 of the device 100. When the injection device 100 is in a state of rest, the valve 10 has a closing portion 59, the lower wall of which closes up the aperture 8, and the side wall of which completely closes up the side port 58 provided in the housing 54.

The supersonic nozzle 6 is externally assembled on the housing 54, for example by welding, so that upon actuating the valve 10, the pressurized gas located in the injection enclosure 46, may escape through the gradually cleared aperture 8 and side port 58, and be ejected from the supersonic nozzle 6 of the device 100.

Let us note that in the preferred embodiment illustrated in FIG. 2, the supersonic nozzle 6 is assembled on the housing 54 of the spring 50 so as to be substantially perpendicular to the latter. Of course, without departing from the scope of the invention, the supersonic nozzle 6 may also be positioned differently, for example according to a specific inclination, determined according to the application of the injection device 100.

The supersonic nozzle 6 mounted on the housing 54 is preferentially of the supersonic Laval nozzle type intended to limit axial dispersion of the gas, and adapted according to the encountered needs. Indeed, it is possible to dimension the inlet and outlet sections of the nozzle 6 in order to obtain a given Mach number. As an example, with an inlet section of 0.8 mm² and an outlet section of 0.5 cm² it is possible to obtain a Mach number equal to 4, with an operating pressure of the injection device 100 which may reach at least 10 bars. The value of the sections of the nozzle 6 may thus be changed in order to obtain a larger Mach number, without departing from the scope of the invention. However, let us note that the dimensioning of the supersonic nozzle 6 should also take into account the field of application of the injection device 100, with the goal of having final bulkiness compatible with this application.

The free piston 4, intended to be set into motion in the first chamber 2 preferably consists of two components. Among both of these components, one of them first of all includes an external bronze component 60, this material providing relatively easy sliding of the free piston 4 within the first chamber 2. When the free piston 4 is propelled towards the first end portion 2a of the chamber 2, its translational displacement is stopped by a shoulder 62, provided in the unique material block 31 in which is made the first chamber 2. Moreover, in this stopping position against the shoulder 62, the external component 60 closes up the side aperture 39 communicating with the adjacent channel 34 so as to close, in the lower portion, the injection enclosure 46 provided in the first end portion 2a of the first chamber 2.

On the other hand, the free piston 4 also includes an internal component 64, arranged in order to slide relatively to the external component 60. The main function of this internal component 64 is to strike the valve 10 when the free piston 4 has been set into motion in the first chamber 2, and slightly before the internal component 60 has been stopped in translation by the shoulder 62. To ensure proper operation of the injection device 100, it is preferable that the recoil of the internal component 64 of the free piston 4, generated during percussion of the valve 6, be limited at the maximum. Thus, it is possible to provide an upper copper or aluminium coating on this internal component 64, in order to cause low recoil as well as a strong seal of the injection enclosure 46.

As a non-limiting example and in combination with the indications already mentioned above, the device 100 for injecting a pulsed supersonic gas flux, according to the preferred embodiment illustrated in FIG. 2, may be designed by observing the following parameters:

- external diameter of the external component 60 of the free piston 4: 16 mm;
- total mass of the free piston 4: 40 g
- stroke of the free piston 4 in the first chamber 2: 85 mm
- volume of the first chamber 2: 17 cm$^3$;
- internal diameter of each of the connection conduits 18 and 20: 6 mm
- length of each of the connection conduits 18 and 20: 5 m;
- volume of each of the connection conduits 18 and 20: 140 cm$^3$;
- external diameter of the controlled piston 16: 32 mm;
- length of the controlled piston 16: 50 mm
- mass of the controlled piston 16: 320 g;
- stroke of the controlled piston 16 in the second chamber 14: 20–40 mm;
- volume of the second chamber 14: 80 cm$^3$.

By means of such an injection device 100, tests carried out on an installation for studying thermonuclear fusion plasmas have demonstrated that it was possible to inject a gas pulse of an amount of the order of 0.2 to 0.5 Pa·m$^3$, for about 0.4 to 0.5 ms up to an operating frequency at least equal to 10 Hertz, and this by providing opening of the valve 10 for a period between 1 and 3 ms. As mentioned earlier, it is recalled that the unit <<Pa·m$^3$>> of the amount of matter used and currently used for fusion plamas, corresponds to the amount of matter contained in a cubic meter at a pressure of one Pascal, measured at a room temperature of 20° C.

Thus, the injection device 100 may allow a rate of rapid and concentrated gas pulses of about 400 Pa·m$^3$/s.

FIGS. 3a–3g schematize the operation of the injection device 100, when the controlled piston 16 (not shown in these figures) is in motion, moving in the direction of the second end portion 14b towards the first end portion 14a of the second chamber 14.

Figure 3A:
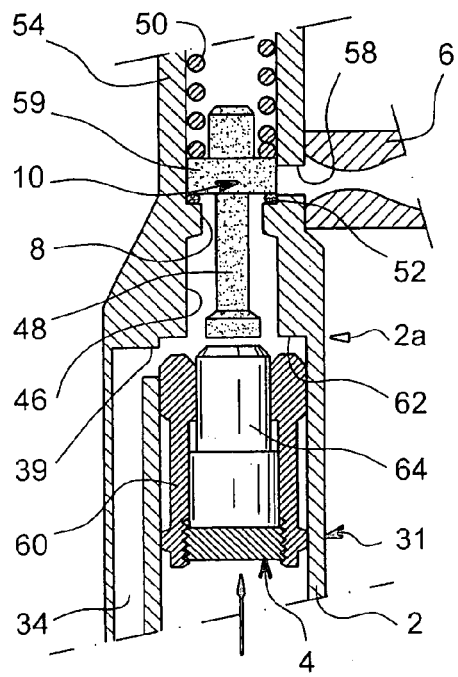
FIGS. 3a–3g schematize the operation of the injection device illustrated in FIG. 2.

As symbolized by the arrow of FIG. 3a, the movement of the controlled piston 16 described above by means of the connection conduits 18 and 20, causes the free piston 4 to be propelled in the direction from the second end portion 2b towards the first end portion 2a of the first chamber 2. Preferentially, the free piston 4, propelled because of the pressure/negative pressure phenomenon occurring on either side of the latter, arrives at the first end portion 2a of the first chamber 2 with a velocity between about 5 and 8 m/s.

Figure 3B:
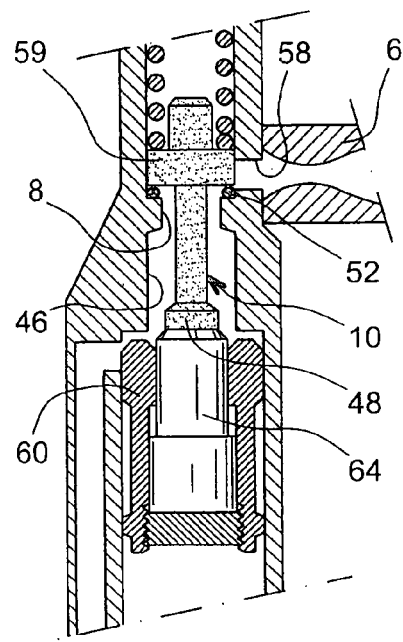

The internal component 64 of the free piston 4 will then strike the head 48 of the valve 10, as illustrated in FIG. 3b. The closing portion 59 of the valve 10 is therefore detached from the gasket seal 52 and a relatively narrow passage allows the gas under pressure contained in the injection enclosure 46 to start to escape towards the supersonic nozzle 6, through the aperture 8 and the side port 58 which are gradually cleared.

Figure 3C:
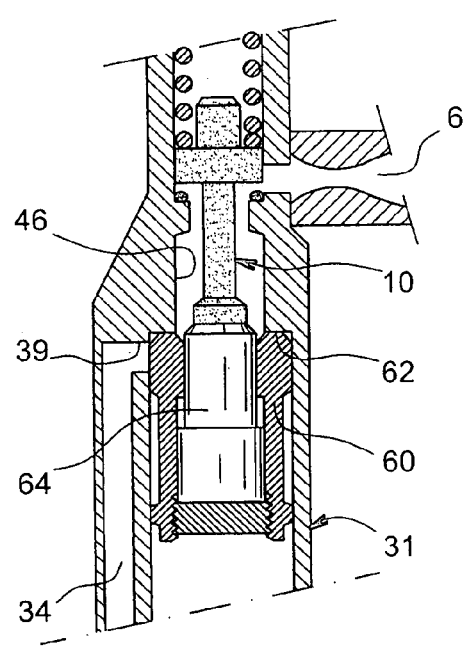

In FIG. 3c, it is seen that after the beginning of the striking of the valve 10 by the internal component 64, the external component 60 of the free piston 4 is still performing translational motion in direction of the first end portion 2a of the first chamber 2, until it is stopped by the shoulder 62, provided for this purpose in the material block 31. In this state, the side aperture 39 between the first chamber 2 and the adjacent channel 34 is closed up by the external side wall of the external component 60 so that the injection enclosure 46 is closed at its lower portion. The injection enclosure 46 is then sealably isolated from the remainder of the first chamber 2 and the pressurized gas therefore empties from this enclosure 46, towards the supersonic nozzle 6. Further, it should be noted that the negative pressure created in the injection enclosure 46 also sealably maintains the external component 60 against the shoulder 62.

Figure 3D:
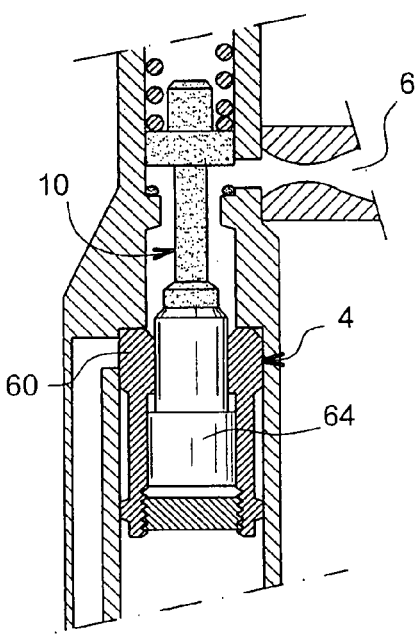

Next, as illustrated in FIG. 3d, the internal component 64 slides in the external component 60 of the free piston 4, in order to cause even more significant opening of the valve 10, and therefore a more consequent flow of pressurized gas towards the supersonic nozzle 6. It is specified that the gas flow is then relatively rapidly controlled by the inlet section of this nozzle 6.

Figure 3E:
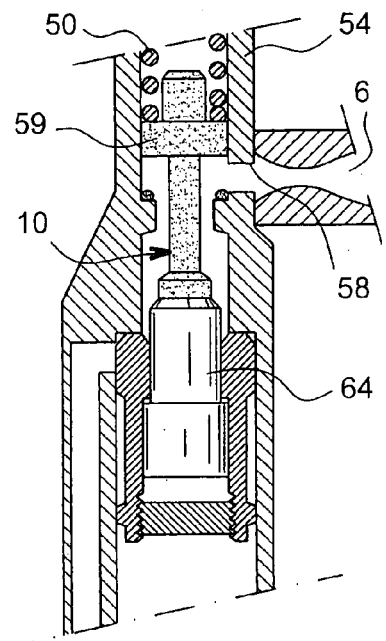
Figure 3F:
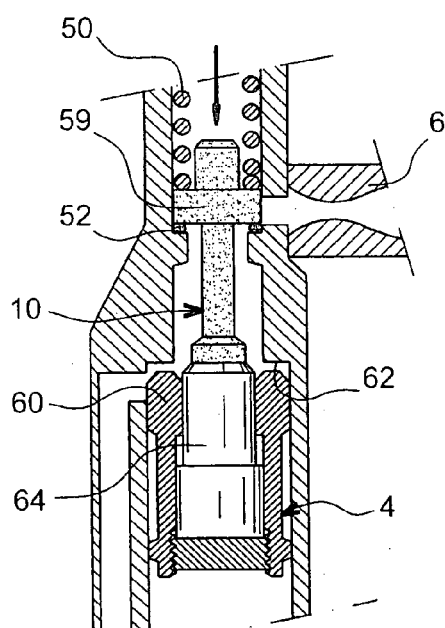

FIG. 3e symbolizes the state in which the valve 10 is actuated at the maximum. In such a state, the side port 58 provided in the housing 54 of spring 50 is totally cleared, whereas the latter was up to now at least partly closed up by the side wall of the closing portion 59 of the valve 10. As such, as mentioned earlier, the spring 50 is compressed in its housing 54 by a force of the order of 25 daN. Further it is specified that in this state, ejection of the gas pulse from the supersonic nozzle 6 is completed.

Figure 3G:
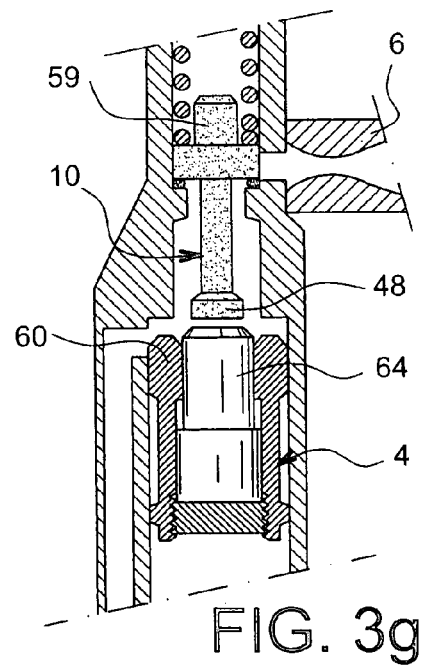

By the action of the compression spring 50, the valve 10 will again close up the aperture 8 provided in the first chamber 2. As this is visible in FIG. 3f, replacement of the valve 10 causes by contact a movement of the external and internal components 60 and 64 of the free piston 4 towards the second end portion 2b, generating detachment of the external component 60 of the shoulder 62. The closing portion 59 of the valve 10 then resumes contact with the gasket seal 52 encircling the aperture 8, 1–3 ms after having left it, until totally crushes it as illustrated in FIG. 3g. In this last figure where it may be considered that the pressures of the gas to be injected are substantially identical on either side of the free piston 4, it is seen that the contact between the head 48 of the valve 10 and the internal component 64 of the free piston 4 no longer exists. However, by inverting the current in the coils 28 and 30 of the magnetic assembly 26 it is possible to generate propulsion of the free piston 4 in the direction of the second end portion 2b, so that it again finds its rest position at the bottom of the first chamber 2 of the injection device 100.

Figure 4:
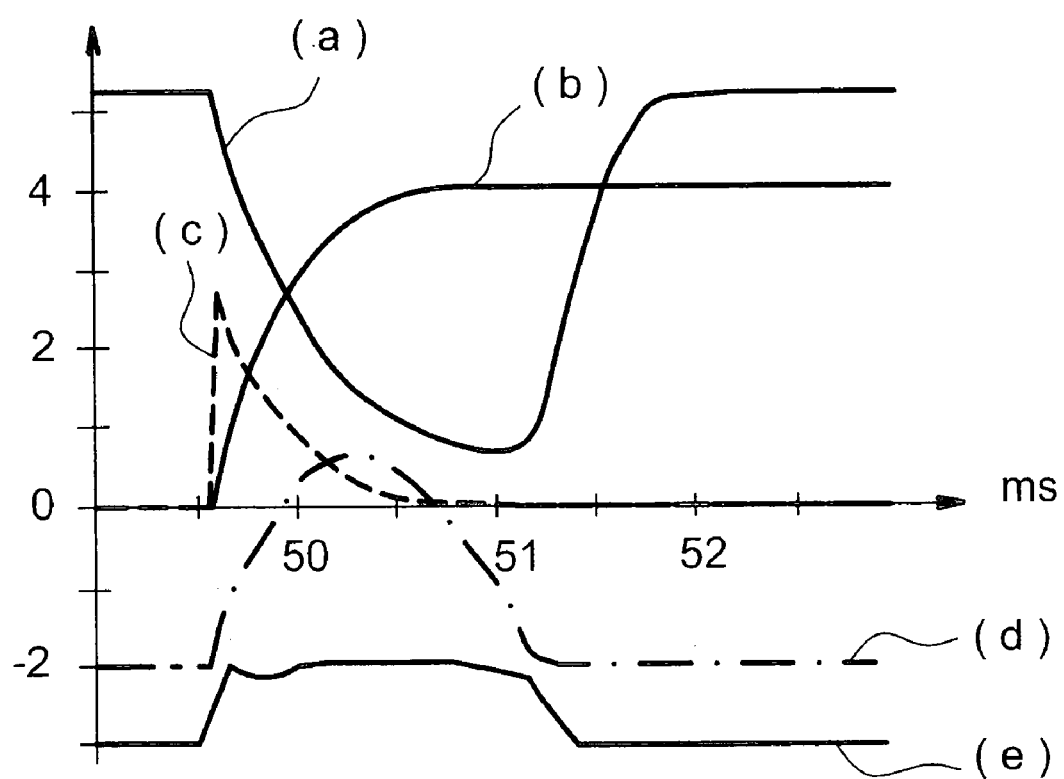
FIG. 4 is a graph illustrating the time course of various parameters of the injection device illustrated in FIG. 2, when the latter is operating.

The time course of various parameters of the device 100 during an injection of a supersonic gas pulse is also illustrated in the graph of FIG. 4, plotted after tests performed on an injection device 100 having technical features similar to those described earlier.

On this graph, the axis of abscissae is an axis of time in milliseconds, whereas the axis of ordinates may differ according to the nature of each of the curves, among which:

- curve (a) illustrates the pressure in bars, inside the injection enclosure 46;
- curve (b) illustrates the amount of gas ejected from the supersonic nozzle 6, in Pa·m$^3$×10;
- curve (c) illustrates the flow rate of gas flowing out of the supersonic nozzle 6, in an arbitrary unit;
- curve (d) illustrates the stroke of the valve 10, in mm;

curve (e) illustrates the stoke of the external component 60 of the free piston 4, in mm.

In this graph, curve (e) shows that after a period slightly less than 50 ms following the energizing of the coils 28 and 30 of the magnetic assembly 26, the external component 60 comes and abuts against the shoulder 62, and slightly recoils against the latter before retaining this position for almost the entire time of the opening of the valve 10. With reference to curve (d), it is seen that the valve 10 is actuated before the external component 60 comes and abuts against the shoulder 62, because of its percussion by the internal component 64 of the free piston 4, as this is described above and illustrated in FIG. 3b.

As soon as the valve 10 begins to open, the value of the gas flow rate ejected from the nozzle 6 becomes maximum even before the external component 60 has been stopped by the shoulder 62, and then substantially decreases exponentially as shown by curve (c). In the same way, the opening of the valve 10 causes a sudden fall in pressure inside the injection enclosure 46, as this is visible on curve (a).

On curve (b), it is seen that throughout the ascending phase of the valve 10, the amount of gas ejected from the nozzle 6 increases over time in order to reach a total amount of the order of 0.4 Pa·m³, about 0.5 ms after the beginning of actuation of the valve 10, the latter however remaining open for a period close to 2 ms. In other words, it has been seen that during the downward movement of the valve 10 towards the aperture 8, the amount of gas ejected from the supersonic nozzle 6 was quasi-zero.

Figure 5:
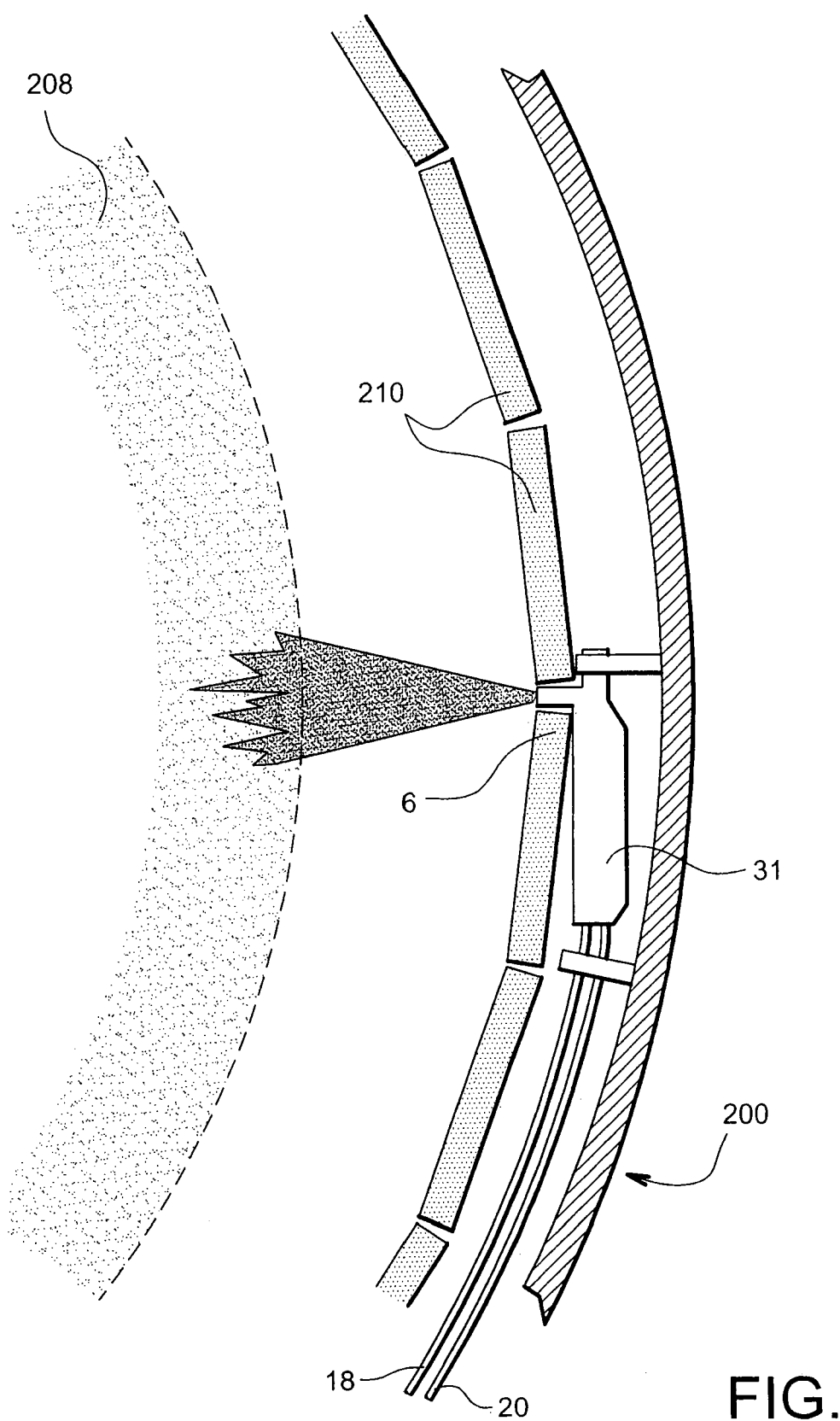
FIG. 5 is a sectional and schematic sectional view of an installation for studying thermonuclear fusion plasmas, onto which the injection device illustrated in FIGS. 2–4 is mounted.

With reference to FIG. 5, the injection device 100 is installed in a torus shaped vacuum chamber 200, similar to the one present in the <<Tore Supra>> thermonuclear fusion installation on which the invention was developed.

In this FIG. 5, it is seen that the material block 31 in which is notably formed the first chamber 2 containing the free piston 4 of the injection device 100, is fixedly mounted on the internal face of the chamber 200. Further, the supersonic nozzle 6 of the device 100 is arranged so that it is located between the cover tiles 210 so that the gas pulses ejected from this nozzle 6 may join the plasma 208.

The material block 31 is fixed so that the first chamber 2 has a substantially vertical position, such as the one illustrated in FIGS. 1, 2 and 3a–3g, always with the purpose that the free piston 4 is positioned by gravity at the bottom of the first chamber 2, when the injection device 100 is in a state of rest.

To ensure operation of the injection device 100, the connection conduits 18 and 20, connected to the first chamber 2, come out of the vacuum chamber 200 so as to be connected to the means 12 for setting the free piston 4 into motion, such as those described earlier. Thus, the second chamber 14 and the magnetic assembly 26 may be located at a distance from the vacuum chamber 200, so that their operation is by no means changed by the presence of the plasma 208. On the other hand, as described above, the second chamber 14 is preferentially positioned vertically at a distance from the vacuum chamber 200 so that the controlled piston 16 is located by gravity at the second end porton 14b when the device 100 is in a state of rest.

By retaining such a technical solution for feeding the plasma 208 with fuel, it is seen that the injection device 100 is quite suitable for supporting the environmental constraints of the vacuum chamber 200.

Indeed, the simplicity of design and the operating mode of the device 100 allows the latter to be placed at a few 10 cm from the plasma 208, in an intense magnetic field of about 6 T and at a temperature of the order of 200–250° C., while supporting the power radiated by the plasma 208, which may reach 1 MW/m³. Moreover, it is further indicated that the proposed injection device 100 is compatible with the ultravacuum prevailing in the chamber 200, this ultravacuum generating a residual pressure of about $10^{-5}$ Pa, required to obtain good quality of the plasma 208.

Of course, the number of injection devices 100 on the vacuum chamber 200 is determined according to the encountered needs, and particularly according to the volume of the plasma 208. As an example, there may be three of them.

Of course, different changes may be provided by one skilled in the art to the injection device 1 and 100 which have just been described, exclusively as non-limiting examples.

The invention claimed is:

1. A device (1,100) for injecting a pulsed supersonic gas flux, characterized it includes a first chamber (2) inside which the gas to be injected is found under pressure on either side of a free piston (4), the device (1,100) comprising means (12) for setting this free piston into motion, connected to said first chamber (2) and capable of causing propulsion of the free piston (4), said device (1,100) further including a supersonic nozzle (6) for ejecting the gas, capable of communicating with the first chamber (2) via an aperture (8) provided in this first chamber (2), and also including a valve (10) closing up said aperture (8) and able to be actuated by percussion of the free piston (4).

2. The injection device (100) according to claim 1, wherein the means (12) for setting the free piston into motion are able to create a pressure difference in the gas to be injected on either side of the free piston (4).

3. The injection device (100) according to claim 1, wherein the means (12) for setting the free piston into motion comprise a second chamber (14) inside which the gas to be injected is found under pressure on either side of a controlled piston (16).

4. The injection device (100) according to claim 3, wherein said second chamber (14) is connected to said first chamber (2) via a first connection conduit (18) having a first end portion (2a) of the first chamber (2) communicate with a second end portion (14b) of the second chamber (14), and via a second connection conduit (20) having a first end portion (14a) of the second chamber (14) communicate with a second end portion (2b) of the first chamber (2), so that a movement of the controlled piston (16) in the direction from the second (14b) to the first end portion (14a) of the second chamber (14) causes the free piston (4) to be propelled in the direction from the second (2b) to the first end portion (2a) of the first chamber (2), and vice versa.

5. The injection device (100) according to claim 4, wherein the second end portions (2b,14b) of the first and second chambers (2,14) correspond to a low end portion of the first and second chambers (2,14) of the device (100), respectively.

6. The injection device (100) according to claim 4, wherein the first end portion (14a) of the second chamber (14) of the device (100) includes a gas inlet (22) intended to be connected to a supply of gas to be injected.

7. The injection device (100) according to claim 3, wherein the controlled piston (16) is able to be actuated by a magnetic assembly (26), including two spaced out coils (28,30) and mounted so as to encircle said second chamber (14) of the device (100).

8. The injection device (100) according to claim 4, wherein the second chamber (14) is provided with an adjustable by-pass (24) allowing the flow of the gas to be injected between the first and second end portions (14a, 14b) of this second chamber (14).

9. The injection device (100) according to claim 4, wherein at least one of the components taken from the free piston (4) and the controlled piston (16) is housed in its associated chamber (2,14), in order to form a narrow passage for the gas, between both compartments of the chamber which it defines.

10. The injection device (100) according to claim 4, wherein said first chamber (2) is closed up at its second end portion (2b) by means of a closing block (40) comprising a first (42) and a second port(44), said first port (42) cooperating with the first connection conduit (18) and opening up into a channel (34) adjacent to the first chamber (2) communicating with the first end portion (2a) of this first chamber (2), said second port (44) cooperating with the second connection conduit (20) and directly opening up into the first chamber (2) of the device (100).

11. The injection device (100) according to claim 4, wherein the valve (10) closing up the aperture (8) provided in the first chamber (2) of the device (100) has a head (48) passing through this aperture (8) and protruding in an injection enclosure (46) provided in the first end portion (2a), said injection enclosure (46) being able to be closed by the free piston (4).

12. The injection device (100) according to claim 11, wherein the free piston (4) includes an external component (60) as well as an internal component (64) sliding in the external component (60), the internal component (64) being intended to strike the head (48) of said valve (10) in order to actuate it, and the external component (60) being intended for closing said injection enclosure (46).

13. The injection device (100) according to claim 1, wherein said valve (10) is tensioned via a spring (50), so as to crush a gasket seal (52) located around said aperture (8) provided in the first chamber (2) of the device (100).

14. The injection device (100) according to claim 13, wherein the spring (50) is located in a housing (54) made as one single part with the first chamber (2), said housing (54) and the first chamber (2) being substantially cylindrical and coaxial and separated by said aperture (8) provided in the first chamber (2) of the device (100).

15. The injection device (100) according to claim 14, wherein the housing (54) of the spring (50) has a port (58), having an interior space of this housing (54) communicate with said supersonic nozzle (6) of the device (100).

16. The injection device (1,100) according to claim 2, wherein the gas to be injected is introduced into the device (100) at a pressure between about 3 and 10 bars.

17. The injection device (1,100) according to claim 1, wherein the means (12) for setting the free piston into motion are able to cause opening of the valve for a period of about 2 ms, and ejection of gas from the supersonic nozzle (6) in an amount of the order of 0.5 Pa·m$^3$ for a period of about 0.5 ms, at an operating frequency of at least 10 Hz.

* * * * *